Dec. 5, 1944.　　　　M. S. ARIENS　　　　2,364,043
ROTARY CULTIVATOR
Filed Sept. 19, 1942　　　　4 Sheets-Sheet 2
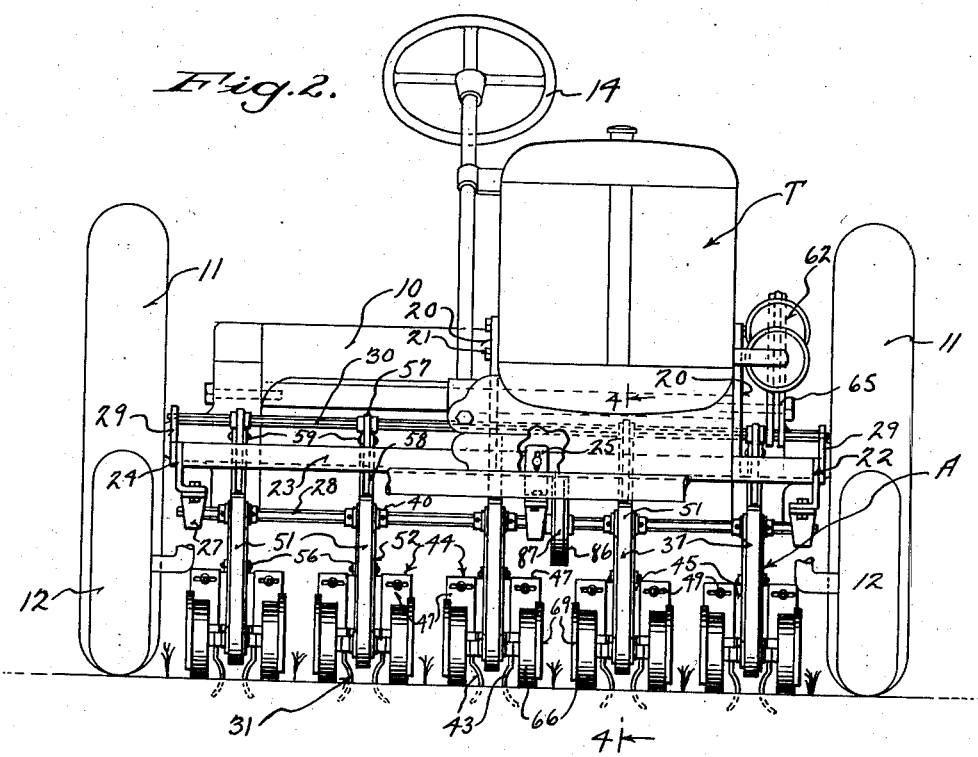
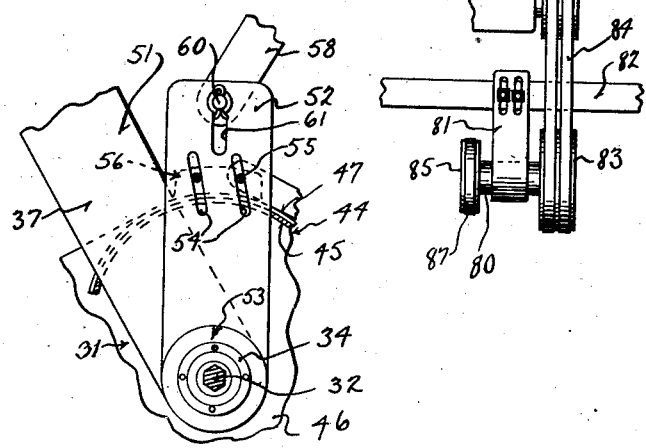
INVENTOR
MANDO S. ARIENS
BY
ATTORNEYS Dec. 5, 1944.                M. S. ARIENS                2,364,043
                            ROTARY CULTIVATOR
                        Filed Sept. 19, 1942          4 Sheets-Sheet 3
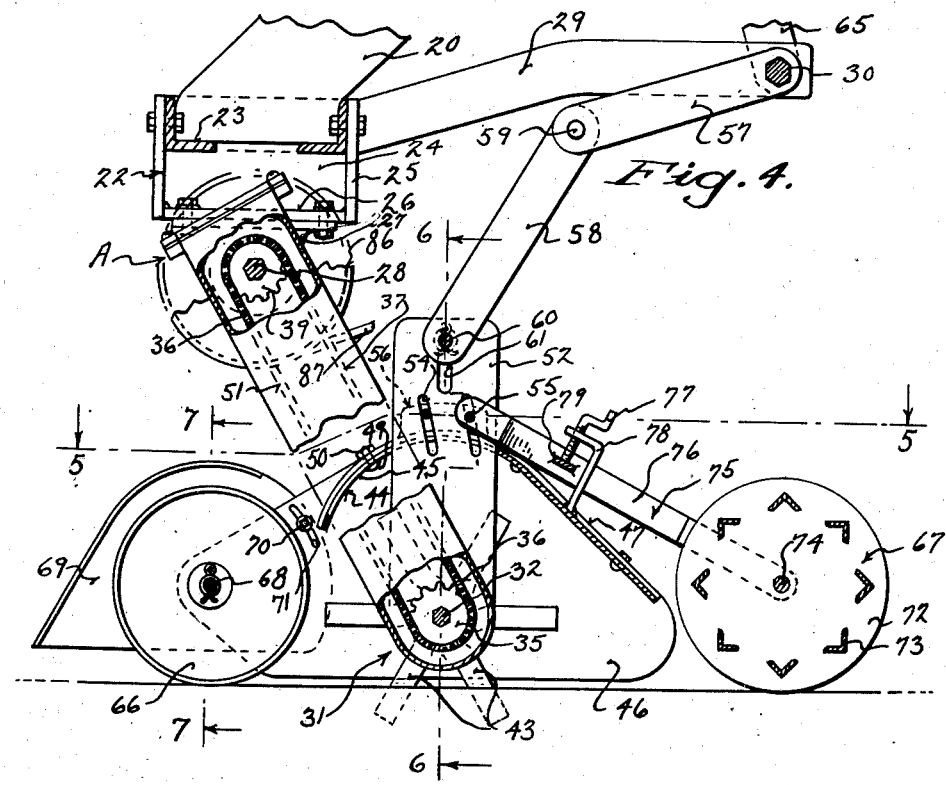
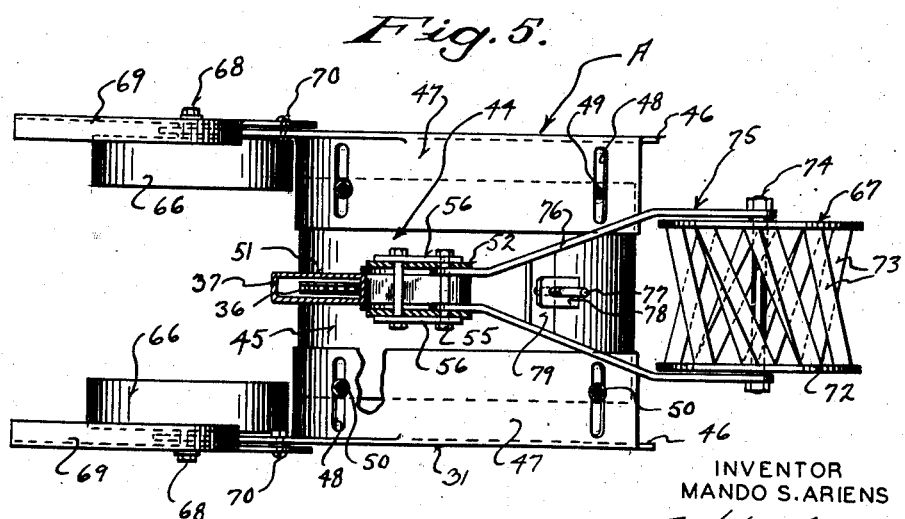
INVENTOR
MANDO S. ARIENS
BY
ATTORNEYS Dec. 5, 1944.　　　M. S. ARIENS　　　2,364,043
ROTARY CULTIVATOR
Filed Sept. 19, 1942　　　4 Sheets-Sheet 4
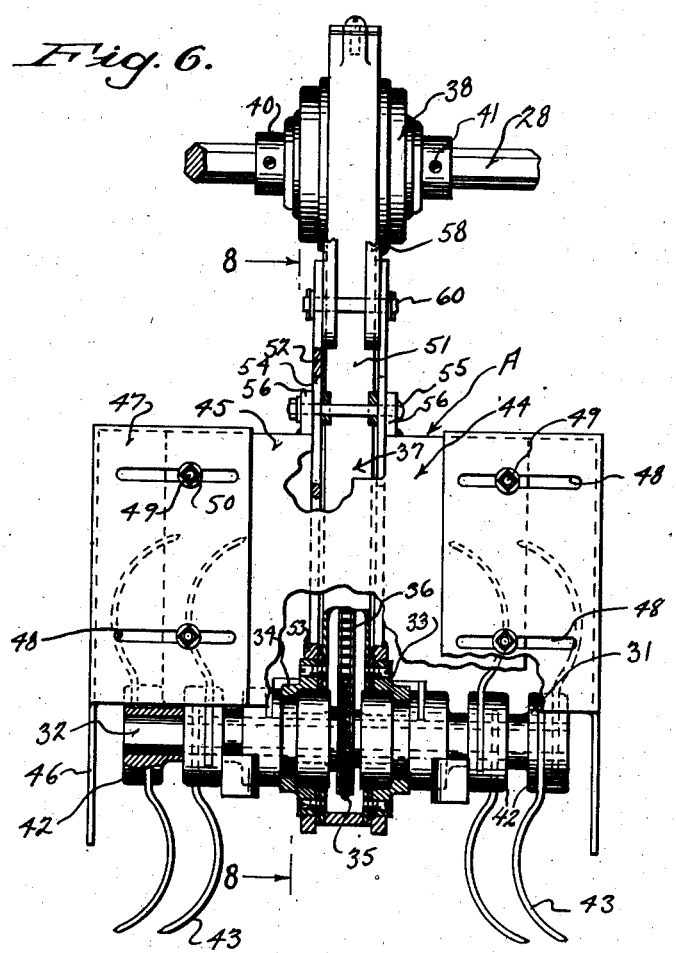
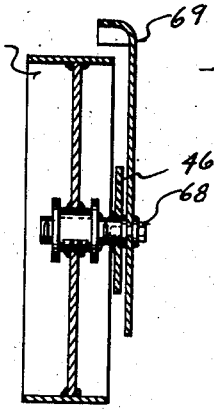
INVENTOR
MANDO S. ARIENS
BY
ATTORNEYS Patented Dec. 5, 1944

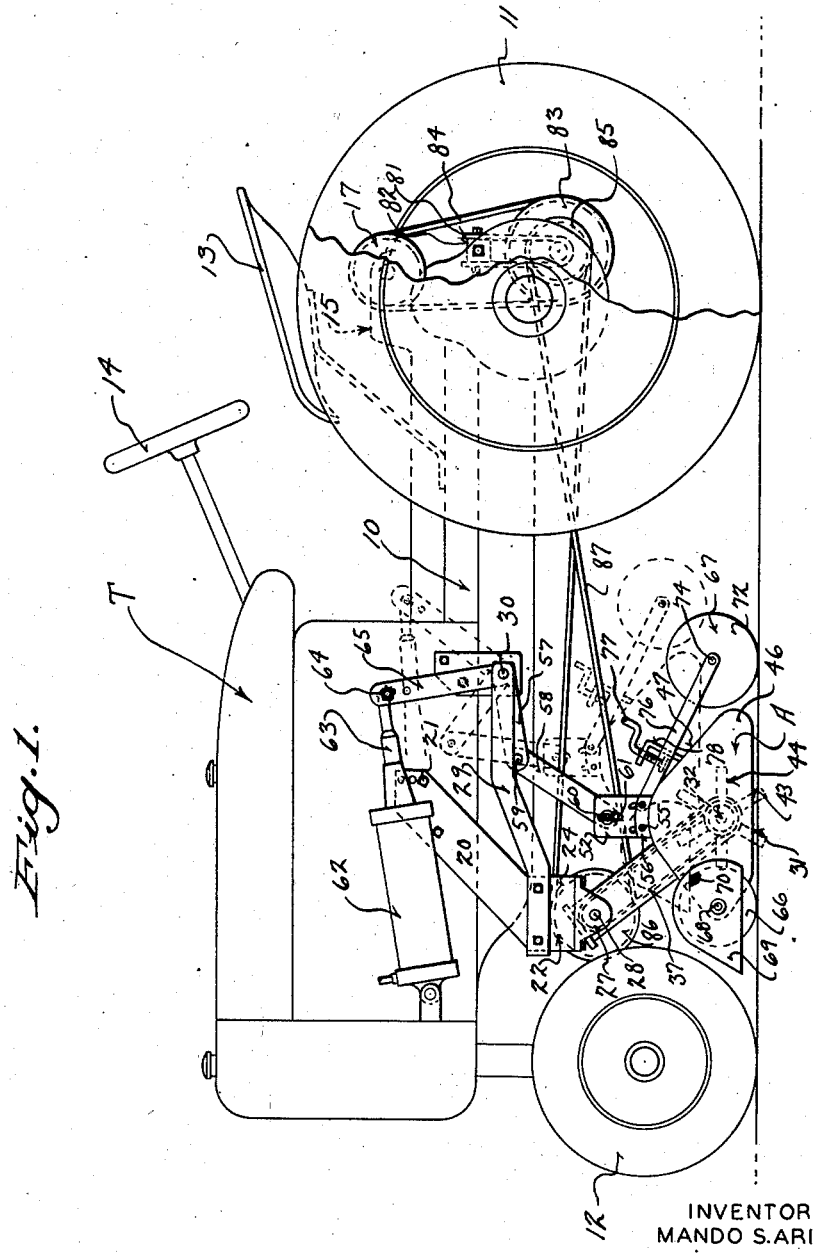

2,364,043

UNITED STATES PATENT OFFICE 2,364,043

ROTARY CULTIVATOR

Mando S. Ariens, Brillion, Wis.

Application September 19, 1942, Serial No. 458,959

9 Claims. (Cl. 97—40)

This invention appertains to farming machinery and more particularly to a power operated row cultivator.

One of the primary objects of my invention is to provide a cultivator attachment of the type which is suspended from a tractor for working the ground between rows of growing plants and which is arranged between the front and rear wheels of the tractor and so disposed that the same can be readily and accurately controlled by the operator of the tractor.

Another salient object of my invention is the provision of a plurality of spaced rotary cultivating units driven from a common drive shaft with means for simultaneously lowering and raising the cultivator units into and out of working engagement with the ground.

Another important object of my invention is the provision of means for independently and rockably supporting the units and for providing the units with independent leading wheels and following wheels for engaging the ground so that the units will independently rock or move automatically to correspond with the character of the land as the tractor advances over a field.

A further object of my invention is the provision of side skirt plates carried by the units for protecting the plants in the rows from the rotary tilling members and from the clods of earth as the ground is worked by the rotary tilling members whereby the plants will not be disturbed or twisted in the ground, the skirts being adjustable toward and away from the tiller members so that plants of different sizes can be taken care of.

A further important object of my invention is the provision of a novel rear ground wheel for each cultivator unit arranged directly in rear of the rotary tilling members whereby not only will each unit be effectively supported, but whereby the clods of earth will be broken up by the rear wheels and the roots of the weeds acted upon and exposed.

A still further important object of my invention is the provision of novel means for connecting the rear ground wheels with the cultivator units, whereby said wheels can be raised or lowered relative to the skirts and the tiller members to suit varying land conditions.

A still further important object of my invention is to provide a rotary cultivator attachment for tractors which can be readily and easily installed on tractors now found in the open market and which will operate efficiently under any and all field conditions and various characters of soil.

With these and other objects in view the invention consists in the novel construction, arrangement and formation of parts, as will be hereinafter more specifically described, claimed, and illustrated in the accompanying drawings, in which drawings:

Figure 1 is a side elevational view illustrating my novel power driven cultivator, parts of the view being shown broken away to illustrate structural details.

Figure 2 is a front elevational view of my novel power driven rotary cultivator.

Figure 3 is a fragmentary rear elevational view illustrating a part of the drive for the rotary tilling members.

Figure 4 is an enlarged detail fragmentary longitudinal sectional view through my cultivator taken on the line 4—4 of Figure 2 looking in the direction of the arrows.

Figure 5 is a horizontal sectional view through one of the cultivator units taken on the line 5—5 of Figure 4 looking in the direction of the arrows.

Figure 6 is a transverse sectional view through one of the cultivator units taken on the line 6—6 of Figure 4 looking in the direction of the arrows, the view being on a still larger scale than Figures 4 and 5.

Figure 7 is a detail sectional view taken on the line 7—7 of Figure 4 looking in the direction of the arrows illustrating one of the front ground wheels carried by one of the side skirt plates.

Figure 8 is a fragmentary sectional view of the lower part of one of the cultivator units illustrating the connection of one of the elevating arms with the tiller unit, the view being taken on the line 8—8 of Figure 6 looking in the direction of the arrows.

Referring to the drawings in detail, wherein similar reference characters designate corresponding parts throughout the several views the letter T generally indicates a tractor and A my novel power driven cultivator attachment therefor.

The tractor T can be of a well known type now found in the open market and will not be described in extreme detail but the same includes a frame or chassis 10, on which is mounted an internal combustion engine and its various appertenances. The chassis also includes widely spaced rear ground wheels 11 and front steerable wheels 12. A seat 13 for the operator of the tractor is provided and the steering wheel 14 for the front ground wheels 12 is arranged in front of said seat. The tractor is provided with a power take-off 15 adjacent to the differential housing and this power take-off includes a shaft 16 provided with a drive pulley 17.

My novel cultivator attachment A includes depending side frame plates or brackets 20 which are firmly and rigidly fastened to appropriate parts of the frame of the tractor as at 21. The lower ends of these depending frame plates or brackets 20 have firmly secured thereto, (such as by welding or the like) a frame beam 22 which extends transversely of the tractor but longitudinally of the cultivator attachment. This frame beam 22 forms the main frame part of the attachment and the same can be constructed in different manners that might suit the taste and individual requirements of different manufacturers. As illustrated, the same includes spaced parallel longitudinally extending angle irons 23 and the brackets or frame plates 20 are firmly secured to these angle irons. The angle irons are united at spaced points and the ends thereof have firmly secured thereto end plates 24. These end plates are braced by side plates 25 and bottom plates 26. The bottom plates 26 have firmly bolted thereto or otherwise connected therewith depending bearing brackets 27 and these bearing brackets carry anti-friction bearings for rotatably receiving the bearing ends of the main drive shaft 28. Attention is called to the fact that this main drive shaft 28 is of polygonal shape in cross section. The shaft extends transversely across the tractor and longitudinally of the cultivator appliance. The end plates 24 have also firmly and rigidly secured thereto rearwardly directed end frame bars 29 and these frame bars rockably support the control shaft 30 which is also of a polygonal shape in cross section.

Arranged below the main drive shaft 28 and the control shaft 30 are a plurality of independent cultivator units 31. In the present showing five units are illustrated, but obviously the number of these units can be increased or decreased according to the size of the cultivator and the tractor. All of these units are identical in construction and each includes a short tiller shaft 32, the central portion of which carries spaced bearing races mounted in bearing caps 34 and between the bearing races and bearing caps is a sprocket wheel 35 mounted upon the tiller shaft for rotation therewith. This sprocket wheel has trained thereabout a sprocket chain 36. These bearing caps 34 are carried by the lower end of a depending hollow arm or casing 37 and this casing not only houses the drive sprockets chain but also forms the support for its tiller unit. The upper end of each supporting arm or hollow casing 37 is mounted for rocking movement and the side walls of the casing receive bearing caps 38 for anti-friction bearing members. Disposed between the bearing members is a drive sprocket wheel 39 around which the drive sprocket chain 36 is trained. The sprocket wheel 39 for each unit is provided with a polygonal shaped opening for receiving the shaft 28 so that the sprocket wheel will be driven thereby and so that the sprocket wheel and the entire unit can be slid longitudinally along the drive shaft 28. Collars 40 are provided for holding the units in an adjusted position on the shaft 28 against sliding movement and the collars can be provided with set screws 41 to hold the same in place.

Referring back to the short tiller shaft 32, it will be noted that the same has mounted thereon for rotation therewith on opposite sides of the bearing caps 34 hubs 42 carrying radially extending tiller teeth or ground working blades 43. Different characters of blades can be used for different land conditions and these teeth or blades are adapted to dig into and effectively work the ground between rows of growing plants.

Each cultivator unit carries a protecting hood 44 which includes an arcuate top guard plate 45 and depending guard skirt plates 46 and the plates are arranged in spaced parallel relation to one another and the lower edges thereof are adapted to travel in relatively close proximity to the ground and adjacent to the rows of growing plants for protecting said plants, as will be later set forth. The plates 46 are adjustably carried by the top wall of plate 45 and these plates 46 are movable toward and away from one another. Hence, each guard skirt plate 46 has formed on or secured to its upper edge an inwardly directed supporting flange 47 which slidably engages the upper surface of the top arcuate wall or plate 45. The flanges 47 of the side skirt plates 46 are provided with transversely extending slots 48 through which protrude bolts 49 carried by said top wall or plate 46 and the bolts 48 have adjustably mounted thereon lock nuts 50 for holding the flanges tightly against said top plate or wall 45.

By loosening the nuts, the flanges and hence the side skirt plates 46 can be adjusted inwardly and outwardly on the bolts. The side skirt plates extend forwardly and rearwardly of the rotary tillers and hence the rotary tillers are substantially inclosed and the growing plants are protected from the teeth or blades 43.

The upper end of each hood, namely the top plate 45, is slotted as at 51 for the reception of the hollow arm or casing 37.

From the description so far, it can be seen that the tiller shaft 32 of each cultivator unit is driven from the main shaft 28 and that each arm or casing 37 is free to rock relative to said shaft 28.

Each tiller unit is provided with a pair of upstanding supporting brackets or plates 52 and the lower ends of these plates or brackets are provided with bearings 53 for rotatably receiving the bearing caps 34. These arms or brackets 52 at a point intermediate their ends, are provided with inclined slots 54 through which slidably extend adjustment bolts 55. These bolts 55 also extend through upstanding ears 56 formed on the central or top plate 45. Nuts are threaded upon these bolts for holding the bolts in an adjusted position in the slots 54. Hence by loosening the nuts and by moving the bolts 55 up or down each protecting hood for each cultivator can be raised and lowered. The top plate 45 is slotted so that the bracket arms 52 can extend therethrough. By this construction of parts, the bracket arms 52 and the protecting hood 44 for each cultivator unit is free to rock relative to the shaft 32.

Means is provided for raising and lowering all of the cultivator units 31 simultaneously and the operating shaft 30 at spaced points is provided with lift cranks 57. These cranks 57 are connected to the cultivator units by means of links 58 and the links are connected to their respective cranks by means of pivot pins 59. The lower ends of the links receive pivot bolts 60 which extend through substantially vertically extending slots 61 formed in the bracket arms 52. The shaft 30 can be operated in any preferred manner for actuating the cranks 57, but I prefer to provide a hydraulic lift mechanism. This hydraulic lift mechanism includes a cylinder 62 having a piston (not shown) and an outwardly extending piston rod 63. The piston rod 63 is connected by means of a pivot pin 64 with the upper end of a crank arm 65 which is secured to the shaft 30. The fluid control for the cylinder 62 has not been illustrated as the hydraulic mechanism itself is of a well known construction found in the open market, but it is to be noted that when the piston rod 63 is forced outwardly, the crank 65 will rotate the shaft 30 in a clockwise direction (see Figure 4) and all of the links 58 will be simultaneously raised and the cultivator units will be lifted off of the ground to the dotted line position shown in Figure 1.

To permit the cultivator units to ride over the ground and to independently conform to the character of the ground over which the tractor travels, each cultivator unit carries a pair of front ground wheels 66 and rear ground wheels 67. The front ground wheels are arranged at the sides of the hoods while the rear ground wheels are arranged in the center of the hoods and directly in rear of the tiller blades or teeth. The front wheels 66 are rotatably mounted upon spindles 68 carried by guard fenders 69. These guard fenders extend forwardly from the side skirt plates 46 and the spindles 68 extend through said side skirt plates. In order to change the angle of the guard fenders 69, the fenders carry bolts 70 which extend through arcuate slots 71 formed in said side skirt plates 46 above and in rear of the spindles 68. Hence the fenders 69 can be swung on the spindles to different adjusted positions.

The rear ground wheels 67 are of a novel construction and each includes end hub plates 72 and connecting cleats 73 which can be formed from angle irons. These cleats 73 preferably extend at an angle to the axle bolts 74 for the rear ground wheels. Each axle bolt 74 extends through the hub plates 72 and each axle bolt is carried by a bracket 75. Each bracket can include side arms 76 and these side arms have their forward ends rockably mounted on one of the cross bolts 55, which is employed for adjustably connecting the hoods to the vertical lift brackets 52. The rear ground wheels can be raised or lowered independently to suit individual requirements by means of hand screws 77. The hand screws 77 are adjustably carried by angle brackets 78 which are welded or otherwise secured to the top walls 45 of the hoods. The lower end of each hand screw bears against a cross plate 79 carried by each of the rear wheel brackets 75.

During the travel of the tractor and cultivator attachment A over the ground, the front and rear wheels of the tractor attachment will ride upon the ground and as objects are encountered or uneven ground is met with, the wheels will effectively rock the cultivator units and raise or lower the same. The raising or lowering of the cultivator units is permitted by the slots 61.

The main drive shaft 28 is driven from the power take-off of the tractor and the shaft 16 of said take-off carries the pulley wheel 17, heretofore mentioned for this purpose. Below the power take-off shaft 16 is arranged a countershaft 80 and this countershaft is rotatably supported from the frame of the tractor in any appropriate manner. As illustrated, a bearing bracket 81 is provided and this bearing bracket is adjustably connected to a brace or beam 82. This beam in turn can be secured to the tractor frame. One end of the countershaft 80 has keyed or otherwise secured thereto a pulley wheel 17 by a belt 84. The shaft 80 also has secured thereto a pulley wheel 85 which is in alignment with a pulley wheel 86 fastened to the main drive shaft 28. A pulley belt 87 operatively connects the pulley wheels 85 and 86 together. This forms a complete and efficient drive for the main shaft 28 and the rotary tiller shafts.

The power lift 62 is utilized for raising all of the cultivator units when the tractor and the cultivator attachment is being moved from one field to another or when it is necessary to lift the cultivator units over a large obstruction when encountered in a field.

By referring to Figure 2, it will be noted that the cultivator units ride between the rows of growing plants and hence there is a row between two adjacent cultivator units. As the side skirt plates 46 ride in close proximity to the plants, these skirts prevent injury to the plants and prevent the plants from being twisted in the ground by the clods of earth. The rapidly driven tiller members effectively work the ground between the rows of plants and the rear ground wheels with their obliquely extending cleats effectively break up the dirt clods and turn over the weeds. Due to the fact that the cultivator units are rockably mounted independently of one another, each unit rides over the ground free of the other units and hence each unit can conform to the exact form of the ground encountered thereby.

From the foregoing description, it can be seen that I have provided an exceptionally simple and durable cultivator attachment for tractors.

Changes in details may be made without departing from the spirit or the scope of my invention, but what I claim as new is:

1. A power driven multiple row cultivator comprising a plurality of independent transversely spaced cultivator units each including a rotary tiller shaft, ground working tines, a forwardly and upwardly extending supporting arm rotatably carrying the tiller shaft and a lift arm rockably carried by the lower end of the supporting arm, a common drive shaft, means rockably mounting the upper ends of the supporting arms on the common drive shaft, means for driving the tiller shafts from the common drive shaft, and means connected with the lift arms for raising and lowering the cultivator units, and a protecting hood for each cultivator unit, said hoods being carried by the lift arms.

2. A power driven multiple row cultivator comprising a plurality of independent transversely spaced cultivator units each including a rotary tiller shaft, ground working tines, a forwardly and upwardly extending supporting arm rotatably carrying the tiller shaft and a lift arm rockably carried by the lower end of the supporting arm, a common drive shaft, means rockably mounting the upper ends of the supporting arms on the common drive shaft, means for driving the tiller shafts from the common drive shaft, and means connected with the lift arms for raising and lowering the cultivator units, and a protecting hood for each cultivator unit, said hoods being carried by the lift arms and front and rear ground wheels for each unit carried by the protecting hood and disposed on opposite sides of the tiller shaft for rocking said units during the travel of the cultivator over uneven ground to permit the effective operation of said units.

3. A power driven multiple row cultivator comprising a plurality of independent transversely spaced cultivator units each including a rotary tiller shaft and ground working tines on said shaft, means rockably supporting each cultivator unit independently of the other units, each of said units also including a protecting hood having depending side guard skirt plates adapted to ride adjacent to the rows of plants being cultivated, means for adjusting the plates toward and away from one another, and means connected to each of said hoods for raising and lowering the units.

4. A power driven multiple row cultivator comprising a plurality of independent transversely spaced cultivator units each including a rotary tiller shaft, ground working tines on said shaft, a supporting arm rotatably carrying the tiller shaft at its lower end, a lift arm rockably connected to the lower end of the supporting arm and said tiller shaft, a protecting hood and a front and a rear ground wheel disposed on opposite sides of the tiller shaft, means securing the hood directly to the lift arm a common drive shaft, the front ends of said supporting arms being mounted on the drive shaft for swinging movement, means for driving the tiller shafts from the common drive shaft, means including a sliding connection with the lift arms for raising the cultivator units, each of said protecting hoods including a curved top wall and depending side guard skirt plates, means adjustably connecting the side plates with the top wall.

5. A power driven multiple row cultivator comprising a plurality of independent transversely spaced cultivator units each including a rotary tiller shaft, ground working tines on said shaft, a supporting arm rotatably carrying the tiller shaft at its lower end, a lift arm rockably connected to the lower end of the supporting arm and said tiller shaft, a protecting hood and a front and rear ground wheel disposed on opposite sides of the tiller shaft, means securing the hood directly to the lift arm, a common drive shaft, the front ends of said supporting arms being mounted on the drive shaft for swinging movement, means including a sliding connection with the lift arms for raising the cultivator units, each of said protecting hoods including a curved top wall and depending side guard skirt plates, means adjustably connecting the side plates with the top wall, guard fenders carried by the forward ends of the side plates and means rotatably mounting the front wheels on said fenders.

6. A power driven multiple row cultivator comprising a plurality of independent transversely spaced cultivator units each including a rotary tiller shaft, ground working tines on said shaft, a supporting arm rotatably carrying the tiller shaft at its lower end, a lift arm rockably connected to the lower end of the supporting arm and said tiller shaft, a protecting hood and a front and a rear ground wheel disposed on opposite sides of the tiller shaft, a common drive shaft, the front ends of said supporting arms being mounted on the drive shaft for swinging movement, means for driving the tiller shafts from the common drive shaft, means including a sliding connection with the lift arms for raising the cultivator units, each of said protecting hoods including a curved top wall and depending side guard skirt plates, means adjustably connecting the side plates with the top wall, guard fenders carried by the forward ends of the side plates and means rotatably mounting the front wheels on said fenders, said fenders being movable to selected angular positions on said side plates.

7. A power driven multiple row cultivator comprising a plurality of independent transversely spaced cultivator units, each of said units including a supporting arm, a rotary tiller shaft carried by the lower end of the supporting arm, a lift arm rockably supported relative to the supporting arm and the tiller shaft, a protecting hood and front and rear ground wheels, means securing the hood directly to the lift arm, a common drive shaft, means supporting the supporting arms for swinging movement from said drive shaft, means operatively connecting each tiller shaft to the drive shaft, a control shaft, a crank arm for each cultivator unit secured to the control shaft, a connecting link for each cultivator unit pivotally connected to its crank and slidably and pivotally connected to its lift arm above the hood, means for rocking the control shaft, each of said hoods including a curved top wall and depending side guard skirt plates for the rows of plants, front wheels for each cultivator unit disposed on opposite sides of the ground working tines, and a rear ground wheel disposed directly in rear of said tines.

8. A power driven multiple row cultivator comprising a plurality of independent transversely spaced cultivator units, each of said units including a supporting arm, a rotary tiller shaft carried by the lower end of the arm, a lift arm rockably supported relative to the supporting arm and the tiller shaft, a protecting hood means securing the hood directly to the lift arm, common drive shaft, means supporting the supporting arms for swinging movement from said drive shaft, means operatively connecting each tiller shaft to the drive shaft, a control shaft, a crank arm for each cultivator unit on said control shaft, a connecting link for each cultivator unit pivotally connected to its crank and slidably and pivotally connected to its lift arm above the hood, means for rocking the control shaft, each of said hoods including a curved top wall and depending side guard skirt plates for the rows of plants, front wheels for each cultivator unit disposed on opposite sides of the ground working tines, and a rear ground wheel disposed directly in rear of said tines, each of said rear ground wheels including spaced side hub discs and connecting clod crushing cleats.

9. A power driven multiple row cultivator comprising a plurality of independent transversely spaced cultivator units, each of said units including a supporting arm, a rotary tiller shaft carried by the lower end of the arm, a lift arm rockably supported relative to the supporting arm and the tiller shaft, a protecting hood, means securing the hood directly to the lift arm, a common drive shaft, means supporting the supporting arms for swinging movement from said drive shaft, means operatively connecting each tiller shaft to the drive shaft, a control shaft, a crank arm for each cultivator unit on said control shaft, a connecting link for each cultivator unit pivotally connected to its crank arm and slidably and pivotally connected to its lift arm above the hood, means for rocking the control shaft, each of said hoods including a curved top wall and depending side guard skirt plates for the rows of plants, front wheels for each cultivator unit disposed on opposite sides of the ground working tines, and a rear ground wheel disposed directly in rear of said tines, each of said rear ground wheels including spaced side hub discs and connecting clod crushing cleats, and means for raising and lowering the rear ground wheels relative to the hoods.

MANDO S. ARIENS.